(12) United States Patent
Chess et al.

(10) Patent No.: US 8,651,205 B2
(45) Date of Patent: Feb. 18, 2014

(54) DIRECT POWER REVERSING DRIVE AXLE

(76) Inventors: Robert Lee Chess, Troutdale, OR (US);
Chenyao Chen, Portland, OR (US);
John Rowley, Tigard, OR (US)

( * ) Notice: Subject to any disclaimer, the term of this patent is extended or adjusted under 35 U.S.C. 154(b) by 165 days.

(21) Appl. No.: 13/202,165

(22) PCT Filed: Feb. 25, 2010

(86) PCT No.: PCT/US2010/025324
§ 371 (c)(1),
(2), (4) Date: Aug. 18, 2011

(87) PCT Pub. No.: WO2010/099267
PCT Pub. Date: Sep. 2, 2010

(65) Prior Publication Data
US 2011/0297460 A1    Dec. 8, 2011

Related U.S. Application Data

(60) Provisional application No. 61/155,995, filed on Feb. 27, 2009.

(51) Int. Cl.
*B62D 11/08* (2006.01)

(52) U.S. Cl.
USPC .......................................... 180/6.2

(58) Field of Classification Search
USPC .................................. 180/6.2, 6.54
See application file for complete search history.

(56) References Cited

U.S. PATENT DOCUMENTS

| | | | |
|---|---|---|---|
| 2,389,339 A | 11/1945 | Ash | |
| 2,825,235 A | 3/1958 | Hindmarch | |
| 3,911,760 A | 10/1975 | Elbers et al. | |
| 4,152,952 A | 5/1979 | Fulmer | |
| 4,328,876 A * | 5/1982 | Horsch | 180/6.44 |
| 4,385,528 A | 5/1983 | Pauwels | |
| 4,495,838 A | 1/1985 | Gooch | |
| 4,635,495 A | 1/1987 | White | |
| 4,702,358 A | 10/1987 | Mueller et al. | |
| 4,754,824 A * | 7/1988 | Olsson | 180/6.48 |

(Continued)

FOREIGN PATENT DOCUMENTS

| | | |
|---|---|---|
| AT | 177322 | 1/1954 |
| CH | 144380 | 3/1931 |

(Continued)

OTHER PUBLICATIONS

Stolowitz Ford Cowger LLP, "Listing of Related Cases", Feb. 6, 2013, 1 page.

(Continued)

*Primary Examiner* — Kevin Hurley
(74) *Attorney, Agent, or Firm* — Stolowitz Ford Cowger LLP

(57) ABSTRACT

A drive axle assembly includes a drive axle configured to rotate with a driving torque, a first clutch pack assembly located at an end of the drive axle, and a second clutch pack assembly located at an opposite end of the drive axle. A first drive wheel assembly is operatively connected to the first clutch pack assembly, wherein the first clutch pack assembly is configured to convert the driving torque of the drive axle to a first driving torque of the first drive wheel. A second drive wheel assembly is operatively connected to the second clutch pack assembly, wherein the second clutch pack assembly is configured to convert the driving torque of the drive axle to a second driving torque of the second drive wheel.

27 Claims, 8 Drawing Sheets

(56) References Cited

U.S. PATENT DOCUMENTS

| | | | |
|---|---|---|---|
| 4,843,907 | A | 7/1989 | Hagin et al. |
| 4,864,881 | A | 9/1989 | Beeson et al. |
| 4,989,703 | A | 2/1991 | Forsyth et al. |
| 5,050,939 | A | 9/1991 | Middelhoven et al. |
| 5,112,113 | A | 5/1992 | Wagner et al. |
| 5,238,298 | A | 8/1993 | Wagner et al. |
| 5,558,590 | A * | 9/1996 | Okada et al. ............ 475/28 |
| 6,186,029 | B1 | 2/2001 | McQuinn |
| 6,206,798 | B1 | 3/2001 | Johnson |
| 6,254,193 | B1 | 7/2001 | Bowman et al. |
| 6,267,188 | B1 | 7/2001 | Bowman et al. |
| 6,298,932 | B1 | 10/2001 | Bowman et al. |
| 6,345,868 | B1 | 2/2002 | Bowman et al. |
| 6,419,325 | B1 | 7/2002 | Bowman et al. |
| 6,471,301 | B1 | 10/2002 | Johnson |
| 6,527,073 | B1 | 3/2003 | Bowman et al. |
| 6,672,985 | B2 | 1/2004 | Chung et al. |
| 6,684,148 | B2 | 1/2004 | Chess |
| 6,890,039 | B2 | 5/2005 | Chung |
| 7,090,608 | B2 | 8/2006 | Han |
| 2008/0314701 | A1 | 12/2008 | Bogelein et al. |
| 2011/0303505 | A1 | 12/2011 | Clark et al. |

FOREIGN PATENT DOCUMENTS

| | | |
|---|---|---|
| EP | 0025716 A3 | 3/1981 |
| EP | 1342591 A2 | 9/2003 |
| EP | 1288054 B1 | 5/2006 |
| JP | 6239264 | 8/1994 |
| JP | 2003159903 | 6/2003 |
| WO | 2010099267 | 9/2010 |
| WO | 2010099315 | 9/2010 |

OTHER PUBLICATIONS

European Patent Office; "PCT International Search Report and Written Opinion of the International Searching Authority" for PCT/US2010/025324, filed Feb. 25, 2010; mailed Jun. 16, 2010; 9 pages.

European Patent Office; "PCT International Search Report and Written Opinion of the International Searching Authority" for PCT/US2010/025408, filed Feb. 25, 2010; mailed Jul. 13, 2010; 16 pages.

Stolowitz Ford Cowger LLC, "Listing of Related Cases", Aug. 18, 2011, 1 page.

* cited by examiner

DIRECT POWER REVERSING DRIVE AXLE

This application claims priority to U.S. Provisional Patent Application Ser. No. 61/155,995, filed on Feb. 27, 2009, which is incorporated by reference in its entirety.

BACKGROUND

There is demand to reduce the operator control effort on fork lift trucks, for example by the reduction or elimination of the service brake effort, which taxes the drivers with continual brake applications during normal operation. Furthermore, park brake levers may wear out and require regular maintenance. By augmenting or replacing the service brakes and/or the parking brakes with clutch pack braking, the above issues regarding operator effort and brake maintenance may be addressed.

Conventional drive axle differentials apply approximately equal driving torque to the drive wheels, for example during tight turns. This tends to force the truck to drive straight forward applying extra loads to the drive train, inside drive tire, and steer tires, which robs power from the hydraulic system during hoisting, wastes fuel and adds to the driver's steering effort. Transmission systems that include clutch packs in the drive axle include separate service brakes, separate park brake and a differential. See, for example, U.S. Pat. No. 7,090,608. Other transmission arrangements that disconnect the engine while providing clutch pack braking also include service brakes, a park brake system and a differential.

The present invention addresses these and other problems.

SUMMARY OF THE INVENTION

A motorized vehicle is herein disclosed as comprising a drive axle, a transmission system configured to apply a driving torque to the drive axle, and a first clutch pack assembly located between the drive axle and an inner drive wheel, wherein the first clutch pack assembly transfers a first portion of the driving torque to the inner drive wheel. The motorized vehicle further comprises a second clutch pack assembly located between the drive axle and an outer drive wheel, wherein the second clutch pack assembly transfers a second portion of the driving torque to the outer drive wheel, and wherein the first portion corresponds to a different amount of driving torque than the second portion.

A drive axle assembly is herein disclosed as comprising a drive axle configured to rotate with a driving torque, first clutch pack assembly located at an end of the drive axle, and a second clutch pack assembly located at an opposite end of the drive axle. A first drive wheel assembly is operatively connected to the first clutch pack assembly, wherein the first clutch pack assembly is configured to convert the driving torque of the drive axle to a first driving torque of the first drive wheel. A second drive wheel assembly is operatively connected to the second clutch pack assembly, wherein the second clutch pack assembly is configured to convert the driving torque of the drive axle to a second driving torque of the second drive wheel, and wherein the first driving torque is greater than the second driving torque.

A method is herein disclosed, comprising monitoring a vehicle steering request, and engaging a first clutch pack assembly associated with an inner drive wheel located on a first side of a motorized vehicle, wherein an engagement force of the first clutch pack assembly is determined, in part, from the vehicle steering request. The method further comprises applying a first driving torque to the inner drive wheel, and engaging a second clutch pack assembly associated with an outer drive wheel located on a second side of the motorized vehicle, wherein an engagement force of the second clutch pack assembly is determined, in part, from the vehicle steering request. A second driving torque is applied to the outer drive wheel, wherein the second driving torque is different than the first driving torque.

The foregoing and other objects, features and advantages of the invention will become more readily apparent from the following detailed description of a preferred embodiment of the invention which proceeds with reference to the accompanying drawings.

DETAILED DESCRIPTION

Figure 1:
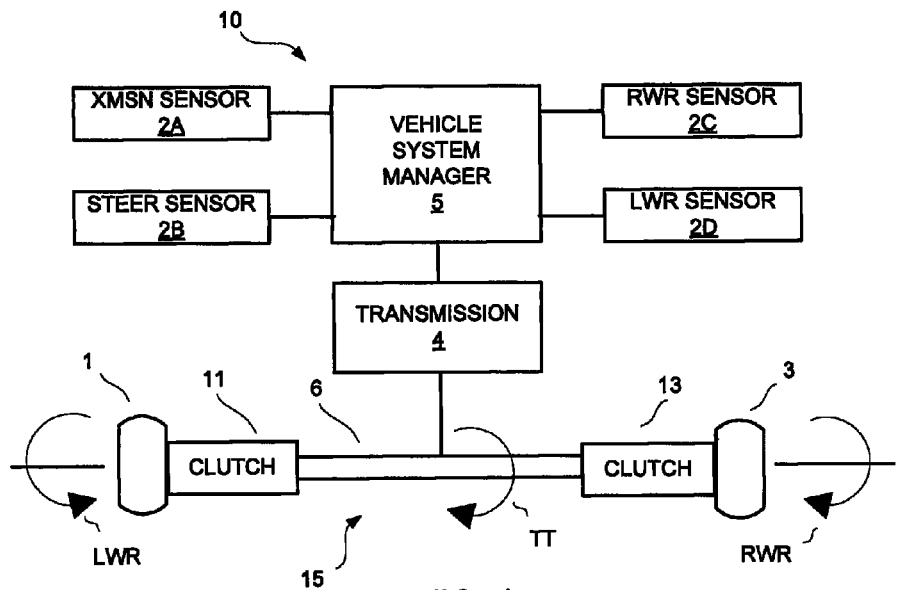
FIG. 1 illustrates a simplified block diagram of a motorized vehicle comprising a drive axle, a transmission system, a first clutch pack assembly located between the drive axle and a first drive wheel, and a second clutch pack assembly located between the drive axle and a second drive wheel.

FIG. 1 illustrates a simplified block diagram of a motorized vehicle 10 comprising a drive axle assembly 15 and a transmission system 4 configured to apply a driving torque to a drive axle or drive shaft 6 of the drive axle assembly 15. The motorized vehicle 10 may comprise an industrial truck, forklift, off-road vehicle, or any other type of vehicle which is otherwise understood to be operable with a conventional transmission system. A first clutch pack assembly 11 is located between the drive shaft 6 and a first drive wheel 1, wherein the first clutch pack assembly 11 is configured to transfer a first portion of the driving torque to the first drive wheel 1. A second clutch pack assembly 13 is located between the drive shaft 6 and a second drive wheel 3.

Braking and turning requirements may be sensed by a truck controller, or vehicle system manager 5, using position sensors to determine the driver's intention and truck dynamics, using speed and pressure sensors. The vehicle system manager (VSM) 5 may receive input from one or more of a transmission sensor 2A, steering sensor 2B, right wheel rotation (RWR) sensor 2C, and left wheel rotation (LWR) sensor 2D. Accordingly, VSM 5 is able to both receive input and send instructions or commands to the transmission system 4, including the first and second clutch pack assemblies 11, 13.

Steer axle turning-effort and traction control limits may be effectively directed by the VSM 5. Computer control of the first and second clutch pack assemblies 11, 13 mounted on each end of the drive shaft 6 eliminate the need for the differential used by conventional transmission systems. By separately controlling an amount of the driving torque provided to the left and right drive wheels, the first drive wheel 1 may be made to rotate at a faster speed than the second drive wheel 3. In other words, a first portion of the driving torque transferred from the drive shaft to the first drive wheel 1 may be different than a second portion of the driving torque transferred to the second drive wheel 3, both with respect to absolute value and rotational direction.

In various embodiments described herein, the first drive wheel 1 may alternately be referred to as an inner drive wheel, or a left drive wheel. The second drive wheel 3 may alternately be referred to as an outer drive wheel, or a right drive wheel. However, which drive wheel is an inner, outer, left, or right drive wheel is dependent in part on a direction of vehicle travel and a steering direction of the vehicle. Accordingly, one skilled in the art would appreciate that either the first or second drive wheels 1, 3 may alternately be referred to as any of the inner, outer, left, or right drive wheels depending on the embodiment or operating condition being described.

Transmission system 4 transmits power from an engine to the drive shaft 6 as transmission torque (TT). The transmission torque causes a rotation of the drive shaft 6 about its axis of rotation. In an embodiment where the transmission system 4 does not include any differential, the rotation of the drive shaft 6 in response to the transmission torque is in the same direction of rotation. Rotational direction control of the first and second drive wheels 1, 3 is independently controlled by the first and second clutch pack assemblies 11, 13. The first clutch pack assembly 11 causes the first drive wheel 1 to rotate in either the same rotational direction, or in an opposite direction of rotation, as the drive shaft 6. Similarly, the second clutch pack assembly 13 causes the second drive wheel 3 to rotate in either the same rotational direction, or in the opposite direction of rotation, as the drive shaft 6.

In one mode of operation, both first and second drive wheels 1, 3 concurrently rotate in the same rotational direction of the drive shaft 6, and in another mode of operation, the first and second drive wheels 1, 3 both rotate in the opposite direction of rotation of the drive shaft 6. In yet another mode of operation, the first drive wheel 1 rotates in an opposite direction of rotation from the second drive wheel 3.

Whereas the clutch pack assemblies 11, 13 are described in certain embodiments as being located on the drive shaft 6, they could also be located on an axle that both provides traction control and controls steering. For example, the clutch pack assemblies 11, 13 could be installed on a vehicle which includes a steerable drive axle. Similarly, the clutch pack assemblies 11, 13 could be located on either a front or rear axle of the vehicle 10. In one embodiment, clutch pack assemblies 11, 13 are installed on both the front and rear of a vehicle equipped with both front and rear wheel drive.

Figure 2:
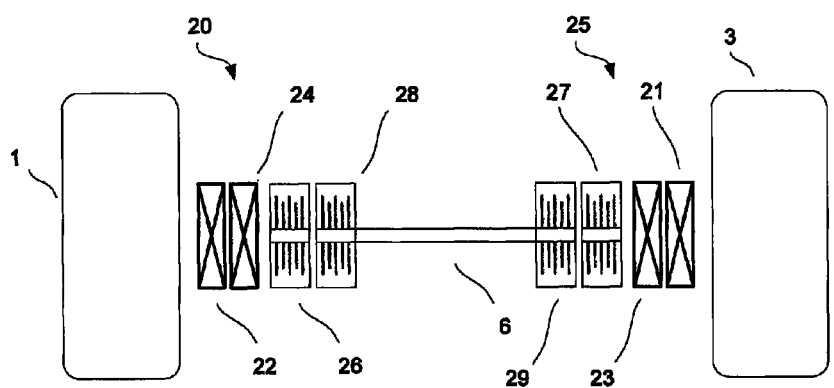
FIG. 2 illustrates a simplified example drive axle assembly comprising a drive axle, a first drive wheel assembly operatively connected to a first clutch pack assembly, and a second drive wheel assembly operatively connected to a second clutch pack assembly.

FIG. 2 illustrates a simplified example drive axle assembly such as the drive axle assembly 15 of FIG. 1. The drive axle assembly comprises a drive shaft 6 which is configured to rotate with a driving torque, a first clutch pack assembly 20 located at a first end of the drive shaft 6, and a second clutch pack assembly 25 located at second end of the drive shaft 6, opposite the first end. A first drive wheel assembly comprising the first drive wheel 1 is operatively connected to the first clutch pack assembly 20, and a second drive wheel assembly comprising the second drive wheel 3 is operatively connected to the second clutch pack assembly 25.

The first clutch pack assembly 20 comprises a first forward clutch pack 26 and a first reverse clutch pack 28. The second clutch pack assembly 25 comprises a second forward clutch pack 27 and a second reverse clutch pack 29. Separate planetary gearing is provided for each of the first clutch pack assembly 20 and the second clutch pack assembly 25. Planetary gearing associated with the first drive wheel assembly and the first clutch pack assembly 20 comprises a first reverse planetary 22 and a first forward planetary 24, whereas a second reverse planetary 21 and second forward planetary 23 are associated with the second drive wheel assembly and the second clutch pack assembly 25.

The planetary gearing is configured to cause the drive wheels 1, 3 to rotate in a reverse or forward direction according to which of the clutch packs 26-29 are engaged, or according to the relative amount of clutch pack slipping as between the respective forward and reverse clutch packs. The planetaries operate to transmit all, or a portion, of the transmission torque operating on the drive shaft 6 to one or both of the drive wheels 1, 3. The drive wheels 1, 3 may be disengaged from the drive shaft 6, such that neither drive wheel 1, 3 rotates while the drive shaft 6 is rotating.

Actuation of a brake pedal may be used to modulate the clutch pack braking by simultaneously applying the forward and reverse clutch packs. For example, first forward clutch pack 26 and first reverse clutch pack 28 may be simultaneously engaged, or partially engaged, to provide for clutch pack braking of the first drive wheel 1. The first forward clutch pack 26 and the first reverse clutch pack 28 may both be in a condition of performing clutch pack slipping in the partially engaged mode of operation, in which case both clutch packs 26, 28 may be used to absorb braking heat or to share the braking energy between the clutch packs.

The first and second driving torques of the first and second drive wheels 1, 3 are varied by slipping the respective first and second clutch pack assemblies 20, 25. In one embodiment, one of the clutch packs 26, 28 may be allowed to slip to a greater degree. For example, the first reverse clutch pack 28 may be allowed to slip more than the first forward clutch pack 26 during clutch pack braking while the motorized vehicle 10 is moving in a forward direction. Similarly, second forward clutch pack 27 and second reverse clutch pack 29 may be simultaneous engaged, or partially engaged, to provide for clutch pack braking of the second drive wheel 3. The first forward clutch pack 28, the second forward clutch pack 27, and the second reverse clutch pack 29 may be simultaneously slipped. Clutch pack braking of the first clutch pack assembly 20 may be made independently from the second clutch pack assembly 25. Systems for clutch pack braking and clutch pack slipping are described by U.S. Pat. No. 6,684,148, herein incorporated by reference in its entirety.

Figure 3:
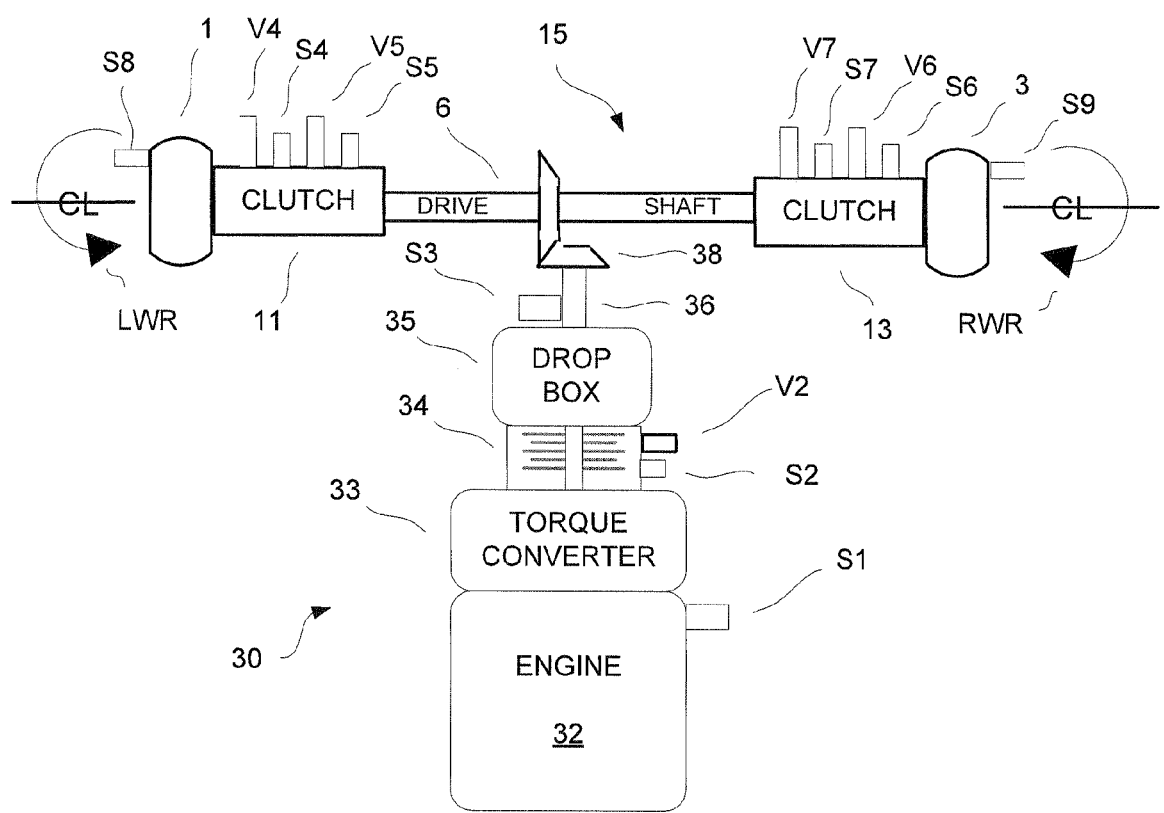
FIG. 3 illustrates an example block diagram of a transmission control system comprising first and second clutch pack assemblies.

FIG. 3 illustrates an example block diagram of a transmission control system 30 and the drive axle assembly 15. The drive axle assembly 15 comprises a drive axle or drive shaft 6 configured to rotate with the driving torque provided by the engine 32 via the transmission control system 30. The drive axle assembly 15 further comprises the first clutch pack assembly 11 located at an end of the drive shaft 6 and the second clutch pack assembly 13 located at an opposite end of the drive shaft 6.

A drive wheel assembly comprising the first drive wheel 1 is connected to the first clutch pack assembly 11, wherein the first clutch pack assembly 11 is configured to convert the driving torque of the drive shaft 6 to a first driving torque of the first drive wheel 1. A drive wheel assembly comprising the second drive wheel 3 is connected to the second clutch pack assembly 13, wherein the second clutch pack assembly 13 is configured to convert the driving torque of the drive shaft 6 to a second driving torque of the second drive wheel 3. In one mode of operation, the first driving torque is greater than the second driving torque. In another mode of operation, the second driving torque is greater than the first driving torque. The first driving torque may be in a same direction of rotation as the second driving torque, or in an opposite direction of rotation.

The first clutch pack assembly 11 may be associated with a left side of the drive shaft 6, such that the first drive wheel 1 could be considered a left drive wheel with a left wheel rotation (LWR). Similarly, the second clutch pack assembly 13 may be associated with a right side of the drive shaft 6, such that the second drive wheel 3 could be considered a right drive wheel with a right wheel rotation (RWR). According to one embodiment, the first clutch pack assembly 11 further comprises a forward left valve V4 and reverse left valve V5 that are operable to provide hydraulic pressure to the forward and reverse clutches of the first clutch pack assembly 11. A forward left pressure gauge or pressure sensor S4 is provided to monitor a hydraulic pressure in the forward clutch left (such as forward clutch 26 in FIG. 2), whereas a reverse left pressure sensor S5 is provided to monitor a hydraulic pressure in the reverse clutch left (such as first reverse clutch 28 in FIG. 2).

The second clutch pack assembly 13 comprises a forward right valve V6 and reverse right valve V7 that are operable to provide hydraulic pressure to the forward and reverse clutches of the second clutch pack assembly 13. A forward right pressure gauge or pressure sensor S6 is provided to monitor a hydraulic pressure in the forward clutch right (such as second forward clutch 27 in FIG. 2), whereas a reverse right pressure sensor S7 is provided to monitor a hydraulic pressure in the reverse clutch right (such as second reverse clutch 29 in FIG. 2).

A travel speed left wheel sensor S8 is provided to monitor the left wheel rotation LWR of the first drive wheel 1 about the centerline CL of the drive shaft 6, whereas the travel speed right wheel sensor S9 is provided to monitor the right wheel rotation RWR of the second drive wheel 3 about the centerline CL of the drive shaft 6.

The transmission control system 30 comprises a torque convertor 33 configured to convert engine torque generated by the engine 32 to a rotational torque applied to the transmission output shaft 36. The transmission control system 30 further comprises an inching clutch 34 and a drop box 35 connected to the transmission output shaft 36. Transmission output shaft 36 is operatively connected to the drive axle via transmission gearing 38. In one embodiment, transmission gearing 38 comprises a plurality of beveled gears configured to cause the drive shaft 6 to continuously rotate anytime the transmission output shaft 36 rotates.

Engine RPM sensor S1 is provided to monitor the engine speed, or number of revolutions per minute, to gauge the power being generated by the engine 32, independent of a rotation of the transmission output shaft 36. Inching clutch 34 may be configured to disengage the engine 32 from the transmission output shaft 36, such that the power of engine 32 may be used during inching operations or to power hydraulic operations or hydraulic pumps associated with a hoist function in an industrial lift truck. The gearing within the transmission gearing 38 may remain engaged with each other even when the engine 32 is disengaged from the transmission output shaft 36. In one embodiment, the transmission gearing 38 remains constantly engaged at all times.

Inching clutch pressure sensor S2 is provided to monitor a hydraulic pressure of the inching clutch 34, whereas inching clutch valve V2 is operable to provide hydraulic pressure to the inching clutch 34, for example, to disengage or partially disengage the engine 32 from the transmission output shaft 36. Torque converter output speed sensor S3 is provided to monitor the rotational speed of the transmission output shaft 36.

When driving normally, for example in a forward direction, only three clutch packs are fully engaged to reduce the transmission drag, namely the three clutch packs include the inching clutch pack and the two forward clutch packs. Similarly, when driving in reverse, only the inching clutch pack and the two reverse clutch packs may be fully engaged.

Positive traction of the vehicle may be maintained without either tire spinning when traversing gravel or on ice. The need for differential driving action is sensed by steer tire turning angle. When a small steering angle is requested (i.e. with a large turning radius), the drive wheel torque of the inner and outer drive tires is equalized together when traction is needed. If the outside wheel is rotating too fast, slipping relative to the sensed steering angle, the driving torque on the inside wheel can be modulated to maintain traction. The torque on the inside tire is increased if the outside tire is over running (slipping) the theoretical speed calculated from the steering angle. During turns, the tire having the greatest dynamic load (e.g. the outside tire) will have the most power applied by virtue of the differential strategy above.

The transmission control strategy is facilitated by employing an inching clutch pack 34 on the engine mounted drop box 35. The engine may be disconnected during inching and simultaneous decelerated by the clutch packs. Clutch pack braking may be provided to slow the truck travel speed while simultaneously operating the engine at a high revolution per minute (rpm) to provide high hydraulic flows. This is further facilitated by the inching clutch pack's ability to disconnect the engine from the power train, so that the truck travel speed deceleration does not load down the engine with drag. The inching clutch may be mounted in other locations between the engine and the axle, than that shown in FIG. 3.

Computer control of first clutch pack assembly 11, the second clutch pack assembly 13, and the inching clutch 34 eliminates the need for the differential found in conventional transmission systems. The differential is eliminated by selectively slipping a selected direction clutch pack according to the measured steer angle of the motorized vehicle. For example, assuming a forward travel of the motorized vehicle with both forward clutches fully engaged, and the vehicle is steered hard to the left. The first clutch pack assembly 11 associated with the first drive wheel 1, or inside drive wheel, is allowed to slip such that the rotational speed LWR of the first drive wheel 1 is decreased with respect to the rotational speed RWR of the second drive wheel 3, or outside drive wheel. Independent control of the rotational speeds LWR, RWR of the first and second drive wheels 1, 3 is therefore accomplished without the need for a conventional differential.

The separate inching clutch 34 is configured to adjust the driving torque provided to the transmission output shaft 36 independent of engine speed and braking action provided by the clutch packs 11, 13 when the engine 32 is used to power the hydraulic system. Accordingly, this system allows automatic throttle-up of engine speed in response to operator hydraulic demand without requiring an increased driving torque to the transmission output shaft 36 or drive shaft 6.

A conventional differential is not required. The differential may be eliminated, gears and all, while being replaced by a fixed gearing element. This is made possible by having the ability to slip right and left clutches at different rates to accommodate different wheel speeds while turning the vehicle. Functionality of the conventional differential action is accomplished by computer control of the direction clutch packs in the drive axle.

The differential action comes from the VSM (Vehicle System Manager 5 in FIG. 1) selectively slipping the right and left driving clutch packs based on steer tire angle and individual drive axle wheel speed. The drive clutch pack pressure may be adjusted by momentary slip action to maintain optimum pack pressures for differential strategy. By only applying the torque/pressure needed, the inside-pack slip losses are limited and fuel efficiency is maximized.

The system limits inside wheel slip horsepower to a minimal hp loss; e.g., less than 5.0 hp. Clutch pack pressures may be controlled according to the clutch pack slip speed and pressure (torque) on the inside wheel pack to calculate losses. The clutch pack slip speed may be calculated by sensing the corresponding wheel speed and taking the ratio between wheel speed and clutch pack speed and comparing it to the axle shaft speed. Other methods of determining clutch pack slip are possible.

Increased engine compartment space is achieved by reducing the size of the transmission housing, since it no longer contains direction or range clutch packs and gears. The transmission is simplified to include a drop box, a converter cover, and a pump drive. Access to the power take off is improved, because of the increased engine compartment space.

Elimination of one or more of the following devices and apparatus is achieved by the system described herein: differential, service and park brake parts, brake-booster, conventional brake lines, wet disk brake cooling lines, park brake cables and actuators, and a transmission control valve.

Elimination of the devices and apparatus also increases space available for plumbing routing. Spiral bevel gears and bearings may be used in the location where the differential would have been, function to reduce shock loads since there is no longer any requirement for power reversal loads on the drive train. There are no power reversal loads transmitted through this gear set, because the power reversal forces are taken up by the forward and reverse clutches in the axle.

Figure 4:
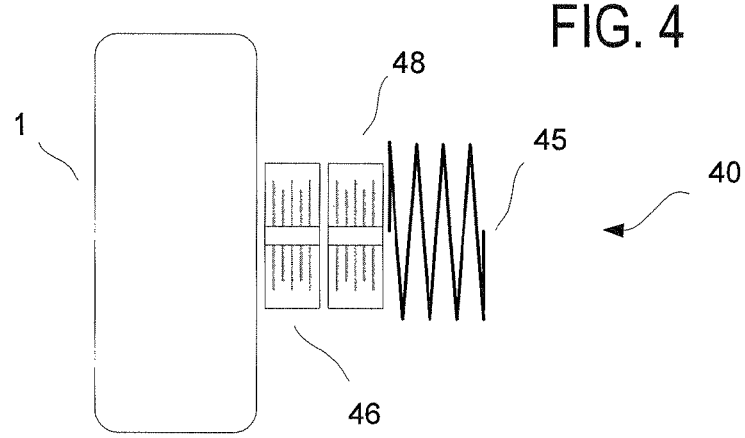
FIG. 4 illustrates an example spring applied clutch pack assembly located adjacent a drive wheel.

FIG. 4 illustrates an example spring applied clutch pack assembly 40 located adjacent a drive wheel, such as first drive wheel 1. A similar and separate assembly may be provided for the second drive wheel 3 (FIG. 3). In one embodiment, the spring applied clutch pack assembly 40 comprises one or more Spring Applied Hydraulically Released (SAHR) devices 45 that engages the clutch packs 46, 48 when hydraulic power is removed, or when the motorized vehicle is powered off. The SAHR device 45 may be configured to provide sufficient power to enable vehicle braking via the clutch packs 46, 48 to bring the motorized vehicle to a controlled stop independent of any operation of brakes.

In one embodiment, the drive axle assembly 15 in FIG. 1 is placed into a hold mode (to decelerate and stop the vehicle) whenever the driver removes his feet from the foot controls (e.g. inching pedal and/or acceleration pedal) by simultaneously engaging forward and reverse clutch packs. A vehicle system comprising clutch pack braking and the spring applied clutch pack assembly 40 operates to replace or provide the same functionality as service brakes and the park brake found in conventional vehicle operating systems. A system comprising a spring applied brake and drive assembly is described by U.S. patent application Ser. No. 12/388,713, herein incorporated by reference in its entirety.

Service and park brakes are not required. Braking is provided by the direction clutch packs. Conventional service and park brakes are grounded to the drive axle and require associated brake linkage. Conventional brakes and the associated linkage are eliminated.

Actuation of the direction clutch packs may be provided by Spring Applied Hydraulically Released (SAHR) design. Truck travel deceleration may be achieved by applying opposing direction clutch packs (forward against reverse) on both the left and right sides of the drive axle.

Braking is independent from side to side of the drive axle. Braking energy may be divided between the forward and reverse clutch packs by slipping all packs simultaneously or alternating in a dithering action between forward and reverse clutch pack pairs. The right forward and reverse clutch packs may alternately be slipped with the left forward and reverse clutch packs. Additionally, the left forward and right reverse clutch packs may be alternately slipped with the left reverse and right forward clutch packs. This divides the deceleration energy between the clutch packs by promoting slipping in each clutch pack.

Park braking may be automatically applied when the driver removes his feet from the foot controls. This is accomplished by the spring applied clutch packs being depressurized when operator request for travel is removed. The service brake function of the clutch packs continues to work if deceleration control on one side truck fails or there is a hydraulic failure.

Figure 5:
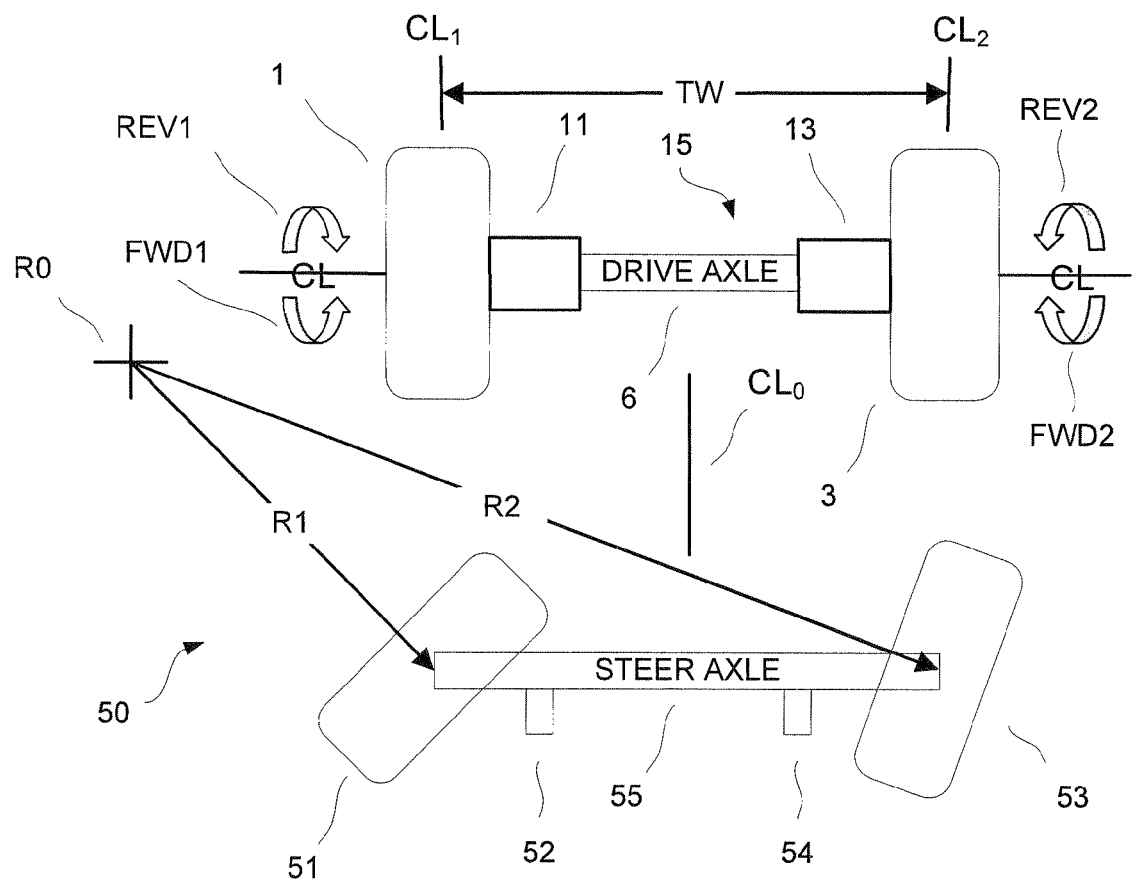
FIG. 5 is a diagram illustrating a vehicle comprising a drive axle assembly and steer axle.

FIG. 5 is a diagram illustrating a vehicle 50 comprising a drive axle assembly 15 and steer axle 55, wherein a first driving torque is applied to an inner drive wheel (e.g. first drive wheel 1) of the drive shaft 6, and wherein a second driving torque is applied to the outer drive wheel (e.g. second drive wheel 3) of the drive shaft 6. The first driving torque is illustrated as forward driving torque FWD1 about the drive axle centerline CL when the inner drive wheel 1 is being rotated in a forward rotational sense, or as reverse driving torque REV1 when the inner drive wheel 1 is being rotated in a reverse rotational sense. The second driving torque is illustrated as forward driving torque FWD2 about the drive axle centerline CL when the outer drive wheel 3 is being rotated in a forward rotational sense, or as reverse driving torque REV2 when the outer drive wheel 3 is being rotated in a reverse rotational sense.

When the vehicle 50 is being turned about center of rotation R0, an inner turn radius R1 is associated with an inner steer wheel 51 of the steer axle 55, whereas an outer turn radius R2 is associated with the outer steer wheel 53 of the steer axle 55. The combined effect of the inner and outer turn radii R1, R2 determine the overall steering angle of the vehicle 50. Steering angles of the inner and outer steer wheels 51, 53 may be monitored by one or more steer angles sensors 52, 54.

When both the first drive wheel 1 and the second drive wheel 3 are rotating in the same directional sense (e.g. in a forward rotational sense), the second driving torque FWD2 may be equal to the first driving torque FWD1 when the vehicle is traveling straight ahead, or in a first range of steering angles. In a second range of steering angles, the second driving torque FWD2 is greater than the first driving torque FWD1. The second range of steering angles may be associated with a smaller range of turning radii of the vehicle as compared to the first range of steering angles. In one embodiment, the above comparison of the driving torques (or rotational speeds) of the first and second driving torques FWD1 and FWD2 assumes a same rate of vehicle travel speed.

Corresponding to an increased steering angle, the center of rotation R0 of the vehicle approaches the centerline $CL_1$ of the inner drive wheel 1. When the center of rotation R0 coincides with the centerline $CL_1$ of the inner drive wheel 1, the vehicle turns about the centerline $CL_1$ of the inner drive wheel 1. As the vehicle rotates about the centerline $CL_1$ of the inner drive wheel 1, the inner drive wheel 1 may be stationary, such that it is not rotating. In one embodiment, the range of steering angle of the vehicle comprises a first steering angle and a second steering angle. When the steering angle changes from the first steering angle to the second steering angle, the second forward driving torque FWD2 of the outer drive wheel 3 approaches the driving torque of the drive axle as the first forward driving torque FWD1 of the inner drive wheel 1 approaches zero torque.

The inner drive wheel 1 may be disengaged from the first clutch pack 11 when the first forward driving torque FWD1 equals zero torque. In one embodiment, a zero torsional force is applied to the inner drive wheel 1 when the center of rotation R0 of the vehicle coincides with the centerline $CL_1$ of the inner drive wheel 1. Clutch pack braking may be applied to the inner drive wheel 1 to control the driving torque FWD1 or keep the inner drive wheel 1 from rotating. The inner drive wheel 1 may be braked via clutch pack braking of the first clutch pack assembly 11 when the second forward driving torque FWD2 equals the driving torque of the drive shaft 6.

As the steering angle of the vehicle increases further still, the center of rotation R0 approaches the centerline $CL_0$ of the vehicle. The centerline $CL_0$ of the vehicle is located intermediate the centerline $CL_1$ of the inner drive wheel 1 and the centerline $CL_2$ of the outer drive wheel 3. The distance between the centerline $CL_1$ of the inner drive wheel 1 and the centerline $CL_2$ of the outer drive wheel 3 is called a tread width (TW) of the vehicle.

In a third range of steering angles, wherein the center of rotation R0 lies within the tread width TW of the vehicle, a reverse driving torque REV1 is applied to the inner drive wheel 1 while the forward driving torque FWD2 is applied to the outer drive wheel 3. The reverse driving torque REV1 may be the same absolute magnitude as the forward driving torque FWD2, but opposite in rotational direction. At certain rates of vehicle travel, the absolute magnitude of the reverse driving torque REV1 applied to the inner drive wheel may be different than (i.e. less than or greater than) the forward driving torque FWD2 applied to the outer drive wheel 3. The relative amount of driving torque applied to the inner drive wheel 1 and the outer drive wheel 3 is independently controlled, respectively, by the first and second clutch pack assemblies 11, 13.

One skilled in the art would appreciate that either the first drive wheel 1 or the second drive wheel 3 may be considered the inner drive wheel or the outer drive wheel depending on the direction of the steering angle of the vehicle. For example, the first drive wheel 1 is considered the inner drive wheel during a forward left turn, whereas the second drive wheel 3 is considered the inner drive wheel during a forward right hand turn. A forward direction of travel, in one embodiment, is understood as the drive shaft 6 being located at a front of the vehicle.

Figure 6:
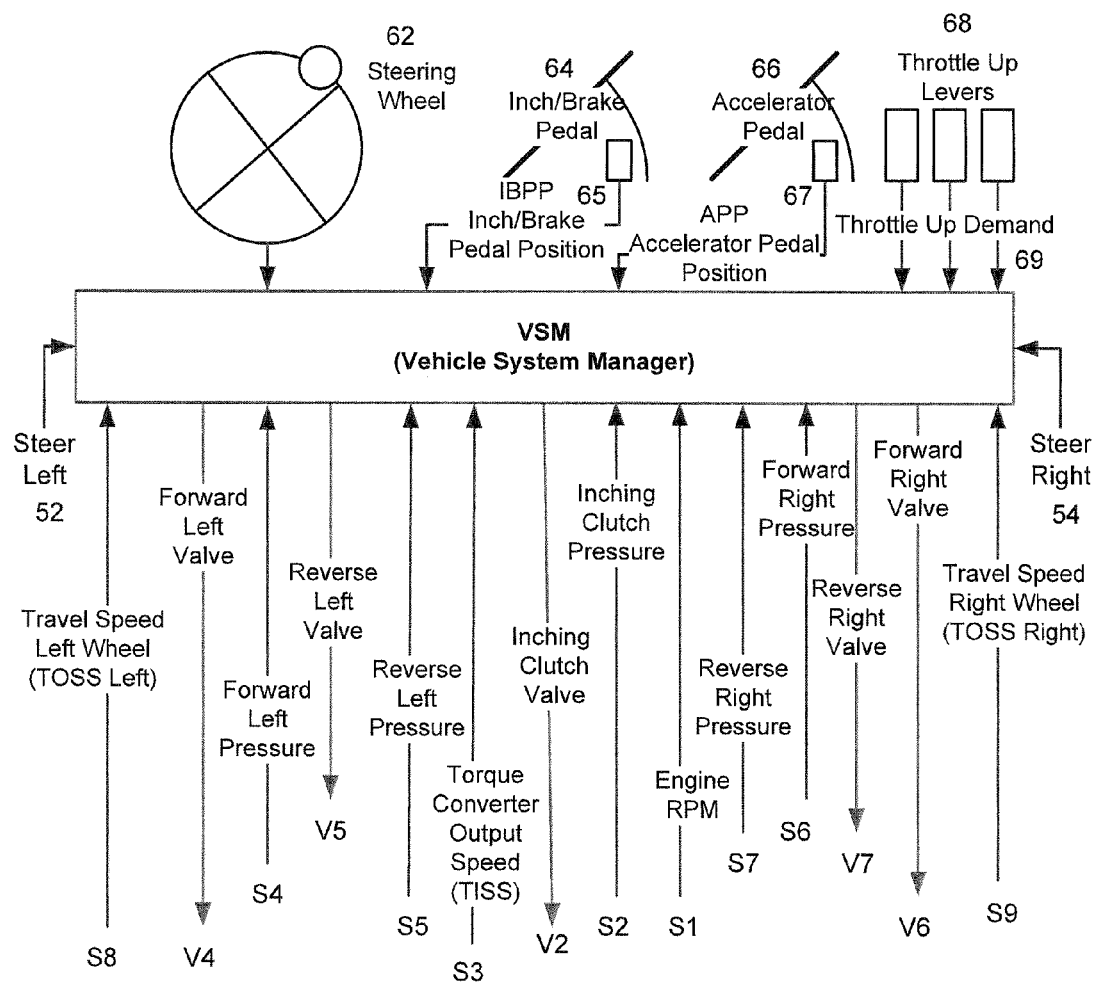
FIG. 6 illustrates an example block diagram of a transmission control system comprising a vehicle system manager and operator controls.

FIG. 6 illustrates an example block diagram of a transmission control system comprising a vehicle system manager (VSM) and operator controls. The operator controls comprise a steering wheel 62, inch/brake pedal 64, accelerator pedal 66, and throttle up levers 68. The VSM monitors or receives input from the operator controls via an inch/brake pedal position sensor 65, an accelerator pedal position sensor 67, and a throttle up demand sensor 69. Steering angle of the vehicle may be monitored directly from the steering wheel 62, or via one or more sensors 52, 54 that identify a steering angle of the steer tires.

The VSM additionally monitors or receives input from the engine RPM sensor S1, the inching clutch pressure sensor S2, the torque converter output speed sensor S3, the forward left pressure sensor S4, the reverse left pressure sensor S5, the forward right pressure sensor S6, the reverse right pressure sensor S7, the travel speed left wheel sensor S8, and the travel speed right wheel sensor S9.

Based on the input from one or more of the sensors, the VSM is configured to control the amount of torque transferred to the left and right drive wheels 1, 3. The VSM can independently control an amount of hydraulic pressure applied to each of the forward left valve V4, reverse left valve V5, forward right valve V6, and reverse right valve V7. The amount of hydraulic pressure applied to the valves determines which clutch packs are engaged, partially engaged, or disengaged. Similarly, the amount of hydraulic pressure determines an amount of clutch pack slipping in one or more of the clutches, or whether clutch pack braking is actuated.

By providing the on-board VSM with the input from the various sensors, and the ability to control the amount of torque and rotational speed of the drive wheels 1, 3, the vehicle may be commanded to a stop from any velocity without the driver pressing any pedals. Similarly, the vehicle may be held steady on an incline without rolling, and without activation of a brake pedal, service brake, or park brake. The vehicle remains stationary on the inclined surface without any need to set a park brake, even when the operator leaves the vehicle. Accordingly, there is also no need to include a service brake or park brake on the vehicle. In one embodiment, activation of the inch-brake pedal 64 is sensed by VSM via the inch-brake pedal position sensor 65 to control an amount of hydraulic pressure applied to one or more of the clutch pack valves V4, V5, V6, V7 to apply clutch pack braking of one or both drive wheels 1, 3 when the driver requests braking of the vehicle.

The zero-roll on a grade is an automatic function and continues with the engine stopped. An engine or hydraulic system failure causes automatic application of the braking function in a controlled manner with a low deceleration rate. This may be accomplished using orifices to control the stopping rate when the system fails.

Independent control of the amount of torque and braking applied to each drive wheel provides for improved maneuverability, for example, around tight turns. In the event a first drive wheel 1 has little or no traction (e.g. when the vehicle is operating on ice, wet pavement, gravel, etc.) traction control may be maintained by diverting some or all of the driving torque to the second drive wheel 3, until the first drive wheel 1 regains traction. In the event of engine or computer failure or loss of hydraulic power, the hydraulic pressure holding off the clutch packs is released, allowing the spring applied braking to actuate. Simultaneous application of forward and reverse direction clutches provides braking. The forward direction clutch may be partially slipped at the same time as the reverse direction clutch is partially slipped. The inch/brake pedal has a hydraulic valve that provides hydraulic supply to the clutch pack valves. Pressing the inch/brake pedal starts dumping the supply pressure mechanically and starts the spring application of the clutches, which causes braking. The inch/brake pedal 64 has a hydraulic connection to the clutch packs in the drive axle. When the inch/brake pedal 64 is pressed, the pressures in the clutch packs 11, 13 are reduced to provide clutch pack braking.

By having the forward and reverse clutches rotate at lower speeds, this reduces parasitic drag of having forward and reverse clutches counter rotating at high speed in a transmission. Roll back of the vehicle located on an incline may be controlled when performing throttle up, and the vehicle may be locked in place with forward and reverse clutch packs engaged.

Controlled torque distribution between left and right drive wheel assemblies may be achieved for the following example vehicle operations: one wheel on ice and one wheel on pavement, sharp turn pivot about inside drive wheel, sharp turn pivot about center line of truck, vehicle travelling on slippery floor with both wheels alternately gaining an losing traction, going uphill in snow, and one wheel climbing out of muddy hole in the ground and the other wheel on level ground.

Figure 7:
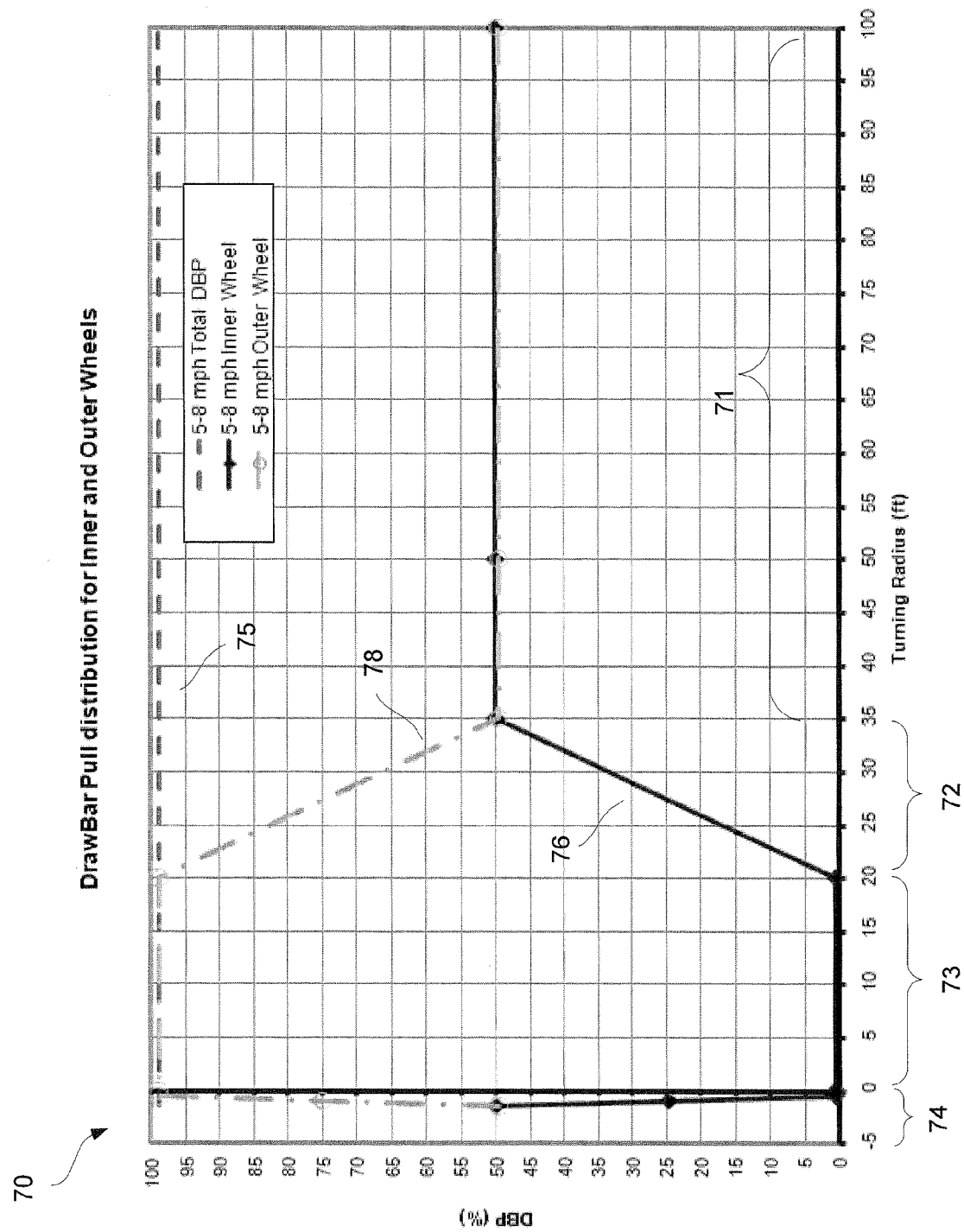
FIG. 7 illustrates an example diagram of drawbar pull distribution at a first range of vehicle travel speed.

FIG. 7 illustrates an example diagram of drawbar pull distribution to the inner and outer drive wheel at a first range of vehicle travel speed. For illustrative purposes only, the vehicle travel speed is shown as being five to eight miles per hour. The graph illustrates the relationship of percent of maximum drawbar pull (% DBP) between the drive axle and the inner and outer drive wheels for a range of vehicle turning radii. The drive axle DBP 75 is illustrated as being a constant 100% of DBP for vehicle turning radii over zero feet. The DBP relationship is described using four ranges of turning radius. A first range of turning radius 71 comprises turning radii of between 35 feet and 100 feet. In the first range of turning radius 71, inner drive wheel DBP 76 is equal or approximately equal to outer drive wheel DBP 78, illustrated as being 50% of DBP. The sum of the inner drive wheel DPB 76 and the outer drive wheel DBP 78 equals the drive axle DBP 75.

A second range of turning radius 72 is illustrated as comprising turning radii of between 20 and 35 feet. In the second range of turning radius 72, inner drive wheel DBP 76 decreases linearly to zero torque as the turning radius decreases from the first turning radius of 35 feet to the second turning radius of 20 feet. As the inner drive wheel DBP 76 linearly decreases to zero torque, the outer drive wheel linearly increases until it is equal to the drive axle DBP 75. At any particular turning radius in the first and second range of turning radius 71, 72, the sum of the inner and outer drive wheel torque equals the drive axle torque.

In the illustrated embodiment, a first steering request or first steering angle is associated with a vehicle turning radius in the first range of turning radius 71, whereas a second steering request or second steering angle is associated with the second range of turning radius 72. The steering angle associated with the second steering request is greater than the steering angle associated with the first steering request. The drive axle torque (or driving torque) may be divided into two portions, including a first portion associated with the outer drive wheel DBP 78, and a second portion associated with the inner drive wheel DBP 76.

The second portion of the driving torque decreases when the steering angle of the motorized vehicle is changed from the first steering angle to the second steering angle, wherein the first portion of the driving torque increases when the steering angle of the motorized vehicle is changed from the first steering angle to the second steering angle. The second portion of the driving torque approaches a same torque value as the driving torque applied to the drive axle at a predetermined steering angle (e.g. shown as occurring at a 20 foot turning radius), whereas the first portion of the driving torque approaches a zero torque value at the predetermined steering angle or turning radius.

In the first and second range of turning radius 71, 72 both the first drive wheel and the second drive wheel may be understood to be engaged in a forward direction of vehicle travel. The first and second portions of the driving torque vary as a function of a steering angle of the motorized vehicle.

A third range of turning radius 73 is illustrated as comprising turning radii of between zero and 20 feet. In the third range of turning radius 73 the inner drive wheel DBP 76 is held at or near zero pounds torque, whereas the outer drive wheel DBP 78 is held constant at the same torque value as the drive axle DBP 75. At any particular turning radius in the third range of turning radius 73, the sum of the inner and outer drive wheel torque equals the drive axle torque.

A fourth range of turning radius 74 is illustrated as comprising turning radius of zero feet, or slightly less than zero feet. A turning radius associated with zero feet is understood to occur when the center of turning radius coincides with the centerline of the vehicle (e.g. centerline $CL_0$ of FIG. 5). When the vehicle turns about its centerline at the zero feet turning radius, inner drive wheel DBP 76 is made equal or approximately equal to outer drive wheel DBP 78, illustrated as being 50% of DBP, however the direction of rotation of the inner drive wheel is opposite to that of the outer drive wheel. During a forward turn about the vehicle centerline, the outer drive wheel is rotated in a forward rotational sense, whereas the inner drive wheel is rotated in a reverse rotational sense. At the zero feet turning radius, the inner drive wheel is rotated with a rotational velocity equal, but opposite in direction, to the outer drive wheel.

The driving torque on the driving clutch pack corresponding to the inside of a turn is progressively reduced as the turning radius becomes smaller. If the turning radius becomes increasingly smaller, the driving torque on the inside end of the drive axle will be reversed enabling a turning center that is between the wheels. Assume the vehicle is making a zero radius turn to the left. As the steer angle in increased more and more the forward left clutch is commanded to slip more and more until it is neutral (no torque) when the turning center is at the left (inner) wheel. As the turn angle increases and the turn center moves inboard of the inner wheel then the reverse left clutch is commanded to transmit torque. At this point the inner wheel begins turning in reverse and the outer wheel is still turning forward. As the steer angle continues to increase the reverse torque continues to be increased on the inner wheel until finally the inner wheel is turning in reverse at the same speed the outer wheel is turning forward and the truck is in a zero radius turn. Turning can be automatically assisted by braking on the inside wheel at appropriate turning angles.

By balancing the driving power applied to the drive tires during turns, the steer tires do not drag, reducing steer tire wear and reducing fuel consumption. Steer tires are not dragged sideways at near torque converter stall during small radius turns. The steering effort is reduced due to by distributing the driving torque to the driving wheels in proportion to the steer angle. A reduction on inside drive tire drag is also reduced. The driving torque is applied to the wheel on the outside of a turn where it will be most effective. Turning and braking action closely emulates the action achieved by dual drive motor axles on electric powered lift trucks.

Figure 8:
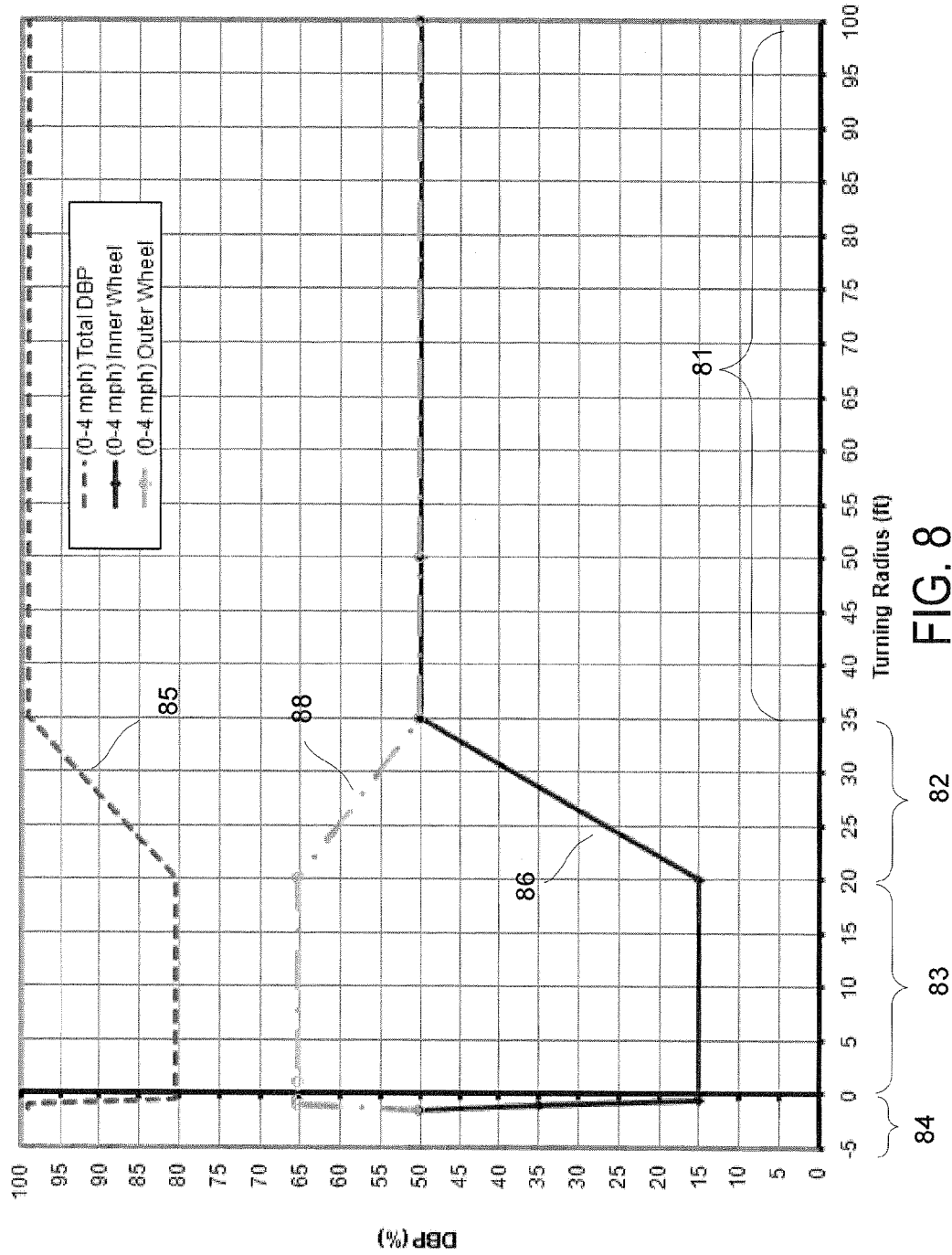
FIG. 8 illustrates an example diagram of drawbar pull distribution at a second range of vehicle travel speed.

FIG. 8 illustrates an example diagram of drawbar pull distribution to the inner and outer drive wheel at a second range of vehicle travel speed. For illustrative purposes only, the vehicle travel speed is shown as being between zero and four miles per hour. As before, the DBP relationship is described using four ranges of turning radius. The drawbar pull is again illustrated as being 100% for the drive axle DBP 85. One skilled in the art would appreciate that the maximum drawbar pull corresponding to 100% DBP will vary for different travel speeds of the vehicle. In one embodiment, the maximum DBP associated with the second range of travel speed is approximately twice as great as the maximum DBP associated with the first range of travel speed illustrated in FIG. 7.

In the first range of turning radius 81, inner drive wheel DBP 76 is equal or approximately equal to outer drive wheel DBP 88, illustrated as being 50% of DBP. In the first range of turning radius 81, the sum of the inner drive wheel DPB 86 and the outer drive wheel DBP 88 equals the driving torque provided by the drive axle DBP 85.

In the second range of turning radius 82, inner drive wheel DBP 86 decreases linearly to approximately 15% of DBP while the DBP 88 increases linearly to approximately 65% of DBP as the turning radius decreases from the first turning radius of 35 feet to the second turning radius of 20 feet. As the inner drive wheel DBP 86 linearly decreases, the outer drive wheel linearly increases. At the second range of vehicle travel speed, the drive axle DBP 85 linearly decreases in the second range of turning radius 82 from 100% DBP to 80% DBP. However, as before, at any particular turning radius in the first and second range of turning radius 81, 82, the sum of the inner and outer drive wheel torque equals the drive axle torque.

In the third range of turning radius 83 the inner drive wheel DBP 86 is held at a constant torque value greater than zero, whereas the outer drive wheel DBP 88 is held constant at a torque value less than that of the drive axle DBP 85. At any particular turning radius in the third range of turning radius 83, the sum of the inner and outer drive wheel torque equals the drive axle torque.

Whereas the driving torque applied to the inner drive wheel was held at zero torque for the higher vehicle travel speed of FIG. 7, in the present embodiment, the inner drive wheel is provided driving torque to increase vehicle traction at the lower vehicle travel speeds.

In the fourth range of turning radius 84 (illustrated as comprising turning radius of zero feet) inner drive wheel DBP 86 is made equal or approximately equal to outer drive wheel DBP 88. This relates to an overall increase in driving torque of the drive axle, illustrated as the drive axle DBP 85 increasing back up to 100% DBP. The direction of rotation of the inner drive wheel is opposite to that of the outer drive wheel. At the zero feet turning radius, the inner drive wheel is rotated with a rotational velocity equal, but opposite in direction, to the outer drive wheel.

Figure 9:
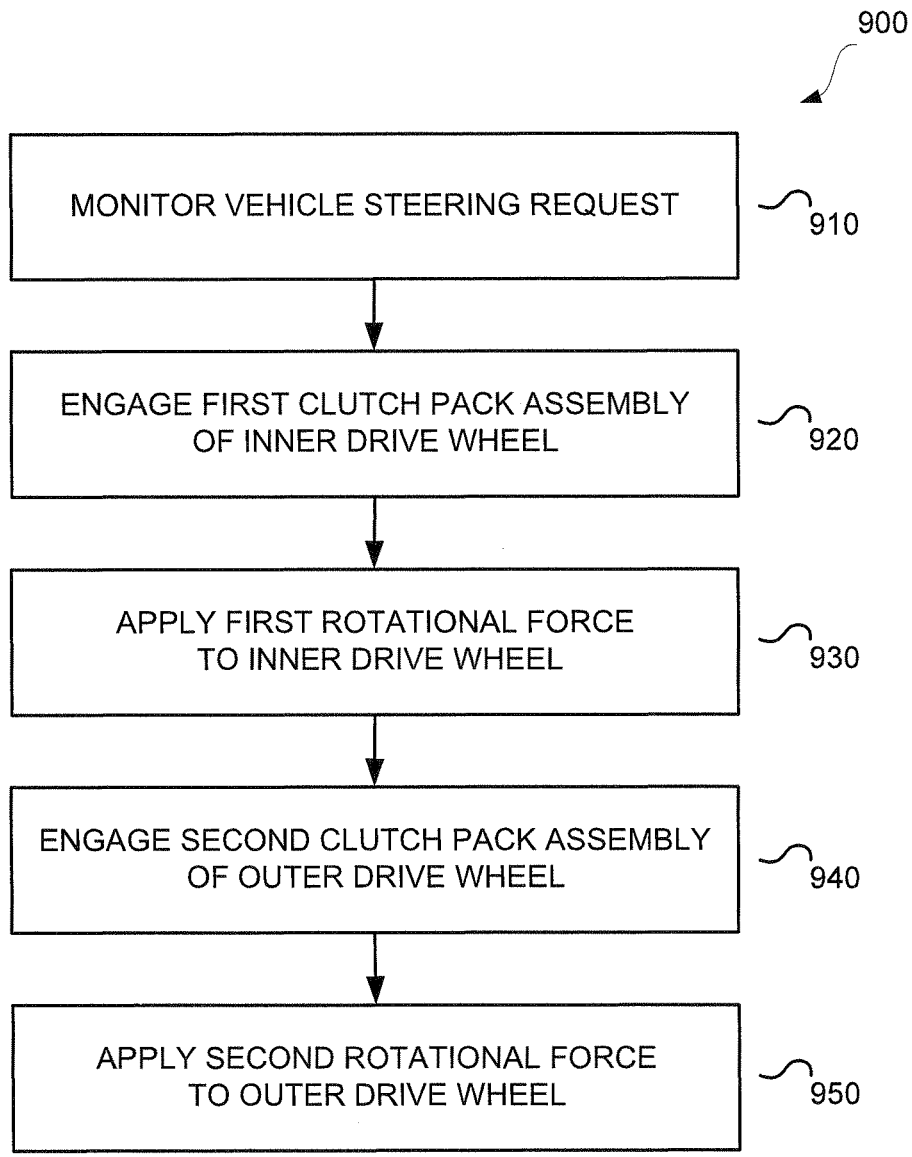
FIG. 9 illustrates a method of engaging a transmission comprising two clutch pack assemblies.

FIG. 9 illustrates a method 900 of engaging a transmission comprising two clutch pack assemblies. At operation 910, a vehicle steering request is monitored. The vehicle steering request may be monitored via input from a steering device or from the one or more steer angle sensors 52, 54.

At operation 920, a first clutch pack assembly associated with an inner drive wheel located on a first side of a motorized vehicle is engaged. The engagement force of the first clutch pack assembly may be determined, in part, from the vehicle steering request.

At operation 930, a first driving torque is applied to the inner drive wheel.

At operation 940, the second clutch pack assembly associated with an outer drive wheel located on a second side of the motorized vehicle is engaged. The engagement force of the second clutch pack assembly may also be determined, in part, from the vehicle steering request.

At operation 950, a second driving torque is applied to the outer drive wheel, wherein the second driving torque is different than the first driving torque. In one embodiment, the second driving torque applied to the outer drive wheel is greater than the first driving torque applied to the inner drive wheel during a first steering request associated with a vehicle turning radius. Both the inner and outer drive wheels may be engaged in a forward direction of vehicle travel when the first and second driving torques are applied.

The first rotation force may be reduced to zero during a second steering request associated with a smaller vehicle turning radius than the first steering request. A reverse driving torque may be applied to the inner drive wheel during a third steering request associated with a smaller vehicle turning radius than the second steering request. The engagement forces of the first and second clutch pack assemblies may be independently determined, in part, from the monitored rotational speeds of the inner and outer drive wheels. The independent control of the torque and rotational speed of the inner and outer drive wheels may be achieved without a conventional differential.

Figure 10:
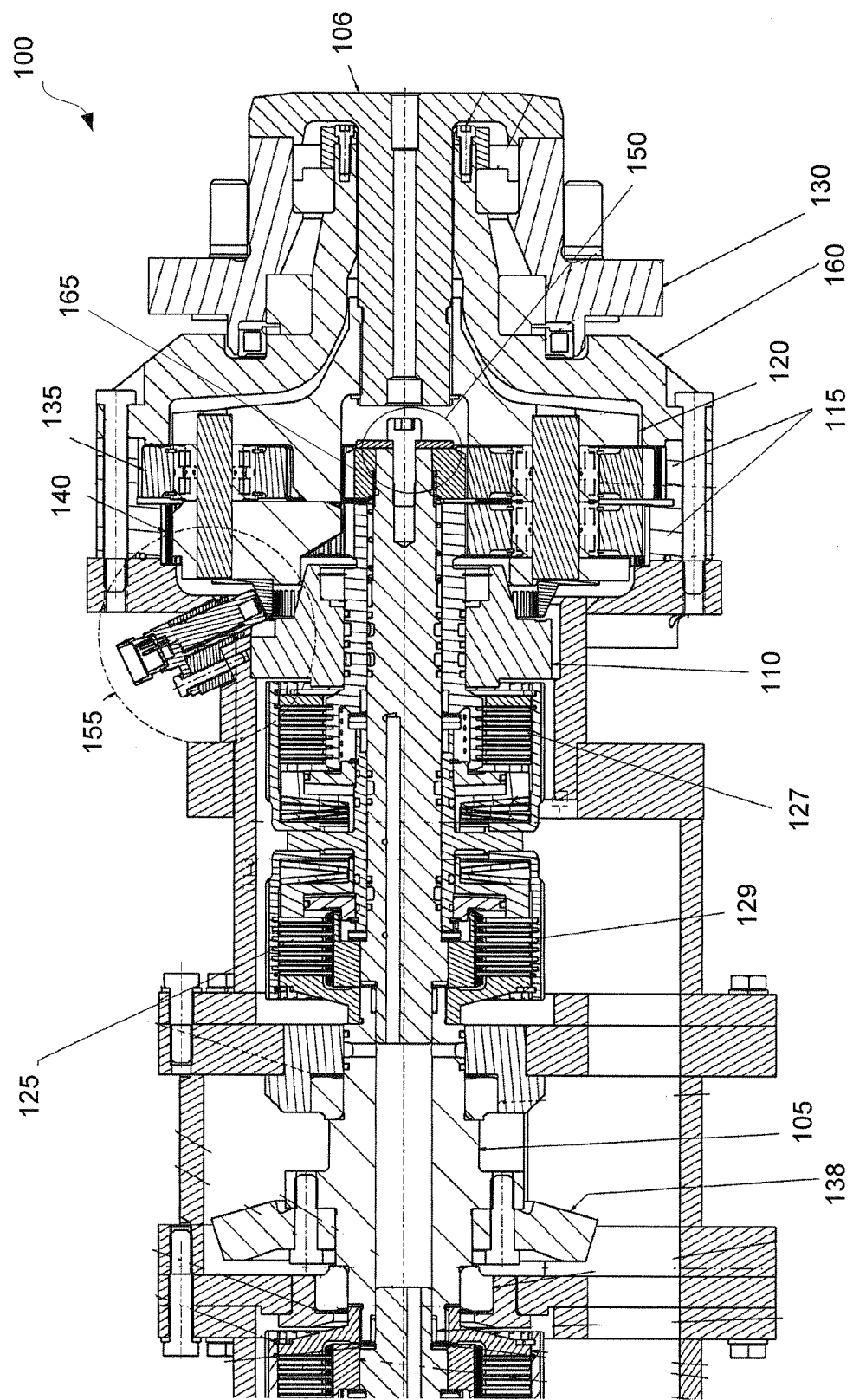
FIG. 10 illustrates an example planetary and clutch pack assembly associated with a drive wheel transmission system.

FIG. 10 illustrates an example planetary and clutch pack assembly associated with a drive wheel transmission system 100. Only one of the clutch pack assemblies 125 is illustrated (e.g. the right hand clutch pack assembly) for sake of clarity, whereas the other clutch pack assembly is understood to operate similarly. The wheel hubs and drive features may be symmetrical, and in the case of loss of function on either side may provide redundancy.

A spirol bevel (or hypoid) 138 drives the left hand clutch pack assembly and the right hand clutch pack assembly. The clutch pack assembly 125 comprises forward clutch pack 127 and reverse clutch pack 129. A solid hub 105 may be locked to both the left hand and right hand clutch pack assemblies. The solid hub 105 transmits the drive torque. The solid hub 105 may be used in place of a differential. A pack pressure manifold 110 communicates the pressures to the forward clutch pack 127 and the reverse clutch pack 129 through rotating seals.

Forward and reverse direction ring gears 115 for forward and backward directions of travel are fixed to the axle 106. In one embodiment, a reversing planetary 135 comprises six gears (planets) that allow the axle 106 to be reversed. The forward planetary 140 may comprise three gears (planets) that allow the axle to drive 106 in the forward direction. A planet carrier 120 on each side of the axle 106 transmits the torque from the planet gears. A sun gear assembly 165 transmits the torque from the forward clutch pack 127 and the reverse clutch pack 129. The sun gear assembly 165 may comprise both a forward sun gear and a reverse sun gear.

A wheel spindle 160 located on each side of the axle 106 supports the weight of the vehicle. The wheel mounts on the wheel hub 130. The left and right axle shafts carry the torque from the planet carrier 120 to the wheel hub 130. A park brake engine off release mechanism 150 allows release of spring applied clutch packs when the engine is off in order to permit towing. The wheel speed sensor 155 senses direction and speed of the wheel. Left hand and right hand wheel speed sensors 155 may be provided for the left hand and right hand wheels, respectively. The forward drive clutch pack 127 and the reverse drive clutch pack 129 may be independently modulated for reversing, braking, traction-control, turning, park braking, and hill holding. In some embodiments, one-way bearings are not required, or may be eliminated.

The system and apparatus described above can use dedicated processor systems, micro-controllers, programmable logic devices, or microprocessors that perform some or all of the operations. Some of the operations described above may be implemented in software and other operations may be implemented in hardware. It is further understood that computer-readable medium having instructions stored thereon may be provided, wherein when the instructions are executed by at least one device, they are operable to perform some or all of the operations.

Where specific numbers are provided, they are given as examples only and are not intended to limit the scope of the claims. The relationship between inputs and outputs of the various operations, computation, and methods described herein may be established by algorithms or by look up tables contained in processor memory.

For the sake of convenience, the operations are described as various interconnected functional blocks or diagrams. This is not necessary, however, and there may be cases where these functional blocks or diagrams are equivalently aggregated into a single logic device, program or operation with unclear boundaries.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A motorized vehicle comprising:
    a drive axle operatively connected to a motor to receive a driving torque;
    a first clutch pack assembly located between the drive axle and a first drive wheel, wherein the first clutch pack assembly includes a first forward clutch arrangement associated with a forward direction of travel and a first reverse clutch arrangement associated with a reverse direction of travel, and wherein at a first steering angle the first clutch pack assembly selectively transfers a first portion of the driving torque to the first drive wheel in a direction of travel selected from the forward direction and the reverse direction; and
    a second clutch pack assembly located between the drive axle and a second drive wheel, wherein the second clutch pack assembly includes a second forward clutch arrangement and a second reverse clutch arrangement, wherein the second clutch pack assembly selectively transfers a second portion of the driving torque to the second drive wheel in the selected direction of travel, wherein the first portion corresponds to a different amount of the driving torque than the second portion at the first steering angle, and wherein at a second steering angle the first clutch pack assembly is configured to apply clutch pack braking to the first drive wheel when the second clutch pack assembly transfers substantially all of the driving torque to the second drive wheel.

2. The motorized vehicle of claim 1, wherein the second drive wheel is configured to rotate at a faster speed than the first drive wheel at the first steering angle, and wherein both the first and second drive wheels are rotating in a same direction of rotation.

3. The motorized vehicle of claim 1, wherein the first and second clutch pack assemblies are configured to vary the first and second portions of the driving torque as a function of a steering angle of the motorized vehicle.

4. The motorized vehicle of claim 3, wherein the second clutch pack assembly is configured to increase the second portion of the driving torque when the steering angle of the motorized vehicle is increased, and wherein the first clutch pack assembly is configured to decrease the first portion of the driving torque when the steering angle of the motorized vehicle is increased.

5. The motorized vehicle of claim 3, wherein the second clutch pack assembly is configured to hold the second portion of the driving torque constant when the steering angle of the motorized vehicle is increased, and wherein the first clutch pack assembly is configured to decrease the first portion of the driving torque when the steering angle of the motorized vehicle is increased.

6. The motorized vehicle of claim 1, wherein the second clutch pack assembly is configured to adjust the second portion of the driving torque to approach a same torque value as the driving torque applied to the drive axle at a predetermined steering angle, and wherein the first clutch pack assembly is configured to adjust the first portion of the driving torque to approach a zero torque value at the predetermined steering angle.

7. The motorized vehicle of claim 6, wherein the first clutch pack assembly is configured to linearly decrease the first portion of the driving torque toward zero torque, and wherein the second clutch pack assembly is configured to linearly increase the second portion of the driving torque toward the same torque value as the driving torque applied to the drive axle.

8. A drive axle assembly, comprising:
    a drive axle configured to rotate with a driving torque;
    a first clutch pack assembly comprising a first forward clutch arrangement and a first reverse clutch arrangement;
    a second clutch pack assembly comprising a second forward clutch arrangement and a second reverse clutch arrangement;
    a first drive wheel assembly connected to the first clutch pack assembly, wherein the first forward clutch arrangement is configured to selectively provide at least a portion of the driving torque of the drive axle to the first drive wheel for rotation in a first rotation direction, and the first reverse clutch arrangement is configured to selectively provide at least a portion of the driving torque of the drive axle to the first drive wheel for rotation in a second rotation direction opposite to the first rotation direction; and
    a second drive wheel assembly connected to the second clutch pack assembly, wherein the second forward clutch arrangement is configured to selectively provide at least a portion of the driving torque of the drive axle to the second drive wheel for rotation in the first rotation direction, and wherein the second reverse clutch arrangement is configured to selectively provide at least a portion of the driving torque of the drive axle to the second wheel for rotation in the second rotation direction.

9. The drive axle assembly of claim 8, wherein the first and second clutch pack assemblies are configured to vary the portion of the driving torque provided to the first and second drive wheels by slipping one or more of the first forward clutch arrangement, the first reverse clutch arrangement, the second forward clutch arrangement, and the second reverse clutch arrangement.

10. The drive axle assembly of claim 8, wherein the first clutch pack assembly is further configured to slip the first forward clutch arrangement and the first reverse clutch arrangement for braking the first drive wheel, and wherein the second clutch pack assembly is further configured to slip the second forward clutch arrangement and the second reverse clutch arrangement for braking the second drive wheel.

11. The drive axle assembly of claim 8, wherein the first clutch pack assembly is further configured to apply the first forward clutch arrangement and the first reverse clutch arrangement to serve as a parking brake for the first drive wheel, and wherein the second clutch pack assembly is further configured to apply the second forward clutch arrangement and the second reverse clutch arrangement to serve as a parking brake for the second drive wheel.

12. The drive axle assembly of claim 8, further comprising a controller communicating with the first clutch pack assembly and with the second clutch pack assembly for selectively activating the first forward clutch arrangement, the first reverse clutch arrangement, the second forward clutch arrangement, and the second reverse clutch arrangement.

13. A motorized vehicle comprising;
a motor that generates a driving torque;
a drive axle operatively connected to the motor to rotate in a rotational direction for transmission of the driving torque;
a first drive wheel located proximate an end of the drive axle;
a second drive wheel located proximate an opposite end of the drive axle;
a first clutch pack assembly comprising a first forward clutch arrangement operatively connected to the drive axle to selectively provide a first portion of the driving torque to rotate the first drive wheel in the rotational direction, and a first reverse clutch arrangement operatively connected to the drive axle to selectively provide a second portion of the driving torque to rotate the first drive wheel opposite to the rotational direction;
a second clutch pack assembly comprising a second forward clutch arrangement operatively connected to the drive axle to selectively provide a third portion of the driving torque to rotate a second drive wheel in the rotational direction, and a second reverse clutch arrangement operatively connected to the drive axle to selectively provide a fourth portion of the driving torque to rotate the second drive wheel opposite to the rotational direction; and
a controller communicating with the first clutch pack assembly and with the second clutch pack assembly, wherein the controller is programmed to selectively operate the first forward clutch arrangement, the first reverse clutch arrangement, the second forward clutch arrangement, and the second reverse clutch arrangement based on one or more of operator inputs, truck parameters, or both, received by the controller.

14. The motorized vehicle of claim 13, further comprising a third clutch pack assembly operatively connected between the motor and the drive axle, wherein the third clutch pack assembly communicates with the controller, and wherein the controller is further programmed to operate the third clutch pack assembly to adjust the driving torque provided to the drive axle based on one or more of operator inputs, truck parameters, or both, received by the controller.

15. The motorized vehicle of claim 13, wherein the controller is further programmed to operate the first forward clutch arrangement and the second forward clutch arrangement to provide a first portion of the driving torque that is substantially equal to the third portion of the driving torque when the first and second drive wheels are in a first range of steering angles.

16. The motorized vehicle of claim 15, wherein the controller is further programmed to operate the first forward clutch arrangement and the second forward clutch arrangement to provide a first portion of the driving torque that is less than the third portion of the driving torque when the first and second drive wheels are in a second range of steering angles that are greater than the first range of steering angles.

17. The motorized vehicle of claim 16, wherein the controller is further programmed to operate the first forward clutch arrangement and the second forward clutch arrangement to provide a first portion of the driving torque that is substantially zero and the third portion of the driving torque that is substantially equal to the driving torque when the first and second drive wheels are in a third range of steering angles that are greater than the second range of steering angles.

18. The motorized vehicle of claim 17, wherein the controller is further programmed to operate the first forward clutch arrangement and the first reverse clutch arrangement to provide clutch pack braking for the first drive wheel.

19. The motorized vehicle of claim 17, wherein the controller is further programmed to operate the first reverse clutch arrangement and the second forward clutch arrangement to provide a second portion of the driving torque that is greater than zero and a third portion of the driving torque that is greater than zero when the first and second drive wheels are in a fourth range of steering angles that are greater than the third range of steering angles.

20. The motorized vehicle of claim 13, wherein the controller is further programmed to:
operate the first forward clutch arrangement and the first reverse clutch arrangement to provide dynamic braking for the first drive wheel; and
operate the second forward clutch arrangement and the second reverse clutch arrangement to provide dynamic braking for the second drive wheel.

21. The motorized vehicle of claim 13, wherein the controller is further programmed to:
operate the first forward clutch arrangement and the first reverse clutch arrangement to provide a parking brake for the first drive wheel; and
operate the second forward clutch arrangement and the second reverse clutch arrangement to provide a parking brake for the second drive wheel.

22. An apparatus, comprising:
means for monitoring a vehicle steering angle;
means for engaging a first clutch pack assembly associated with a first drive wheel located on a first side of a motorized vehicle by selectively engaging a first forward clutch or a first reverse clutch of the first clutch pack assembly, wherein an engagement force of the first clutch pack assembly is determined, at least in part, from the vehicle steering angle;
means for applying a first driving torque to the first drive wheel in a selected direction of vehicle travel;
means for engaging a second clutch pack assembly associated with a second drive wheel located on a second side of the motorized vehicle by selectively engaging a second forward clutch or a second reverse clutch of the second clutch pack assembly, wherein an engagement force of the second clutch pack assembly is determined, at least in part, from the vehicle steering angle; and
means for applying a second driving torque to the second drive wheel in the selected direction of vehicle travel, wherein the second driving torque is substantially equal to the first driving torque for a first vehicle steering angle, and wherein the second driving torque is different from the first driving torque for a second vehicle steering angle.

23. The apparatus of claim 22, wherein the second driving torque applied to the second drive wheel is greater than the first driving torque applied to the first drive wheel when the monitored vehicle steering angle corresponds to the second vehicle steering angle associated with a vehicle turning radius, and wherein both the first and second drive wheels are engaged in the selected direction of vehicle travel.

24. The apparatus of claim 23, wherein the means for applying a first driving torque comprises means for reducing the first driving torque toward zero when the monitored vehicle steering angle corresponds to a third vehicle steering angle associated with a smaller vehicle turning radius than the second vehicle steering angle.

25. The apparatus of claim 24, wherein the means for applying a first driving torque comprises means for applying a reverse driving torque to the first drive wheel when the monitored vehicle steering angle corresponds to a fourth vehicle steering angle associated with a smaller vehicle turning radius than the third vehicle steering angle.

26. The apparatus of claim 22, further comprising means for monitoring rotational speeds of the first and second drive wheels, wherein the engagement forces of the first and second clutch pack assemblies are independently determined, at least in part, from the rotational speeds.

27. The apparatus of claim 26, wherein the monitored rotational speed of the wheels indicates that the second wheel is slipping, and wherein the engagement of the first clutch pack assembly and of the second clutch pack assembly is adjusted to reduce slipping of the second wheel in response to an indication that the second wheel is slipping.

* * * * *

UNITED STATES PATENT AND TRADEMARK OFFICE
CERTIFICATE OF CORRECTION

PATENT NO. : 8,651,205 B2  Page 1 of 1
APPLICATION NO. : 13/202165
DATED : February 18, 2014
INVENTOR(S) : Chess et al.

It is certified that error appears in the above-identified patent and that said Letters Patent is hereby corrected as shown below:

On the Title Page:

Item (76) should be Item (75)

Item (73) after the "Inventors" section insert --Assignee: NMHG Oregon, LLC, Fairview, Oregon--

Signed and Sealed this
Twenty-sixth Day of August, 2014

Michelle K. Lee
*Deputy Director of the United States Patent and Trademark Office*